United States Patent [19]

Krumscheid

[11] Patent Number: 4,731,992
[45] Date of Patent: Mar. 22, 1988

[54] FUEL SUPPLY DEVICE FOR ENGINES, MORE PARTICULARLY OF MODEL AIRCRAFT

[76] Inventor: Günter Krumscheid, Halinger Dorfstrasse 83, D-5750 Menden 1, Fed. Rep. of Germany

[21] Appl. No.: 860,145

[22] Filed: May 6, 1986

[30] Foreign Application Priority Data

May 11, 1985 [DE] Fed. Rep. of Germany ....... 3517120

[51] Int. Cl.$^4$ .............................................. F02B 37/02
[52] U.S. Cl. ..................................... 60/281; 181/254; 123/457
[58] Field of Search ................... 123/457, 510–511; 60/281, 280, 324; 181/253, 254, 211, 236, 404

[56] References Cited

U.S. PATENT DOCUMENTS

| 1,363,001 | 12/1920 | Lockart | 60/281 |
| 2,059,325 | 11/1936 | Ericson | 158/36.5 |
| 2,071,116 | 2/1937 | French | 60/281 |
| 2,175,463 | 10/1939 | Haring | 60/281 |
| 2,372,700 | 4/1945 | Allen | 158/36 |
| 2,919,540 | 1/1960 | Perciual | 60/281 |
| 2,966,036 | 12/1960 | Stowens | 60/281 |
| 3,500,635 | 3/1970 | Roper | 60/281 |
| 4,643,272 | 2/1987 | Gaffrig | 181/254 |

FOREIGN PATENT DOCUMENTS

| 2235913 | 4/1973 | Fed. Rep. of Germany . |
| 495587 | 9/1917 | France . |
| 832936 | 4/1960 | United Kingdom . |

Primary Examiner—Carl Stuart Miller
Attorney, Agent, or Firm—Sprung Horn Kramer & Woods

[57] ABSTRACT

The invention relates to a fuel supply device for model aircraft. To produce an excess pressure in the fuel tank in order to force the fuel into the engine, the fuel tank is connected to an excess pressure chamber (4) of an exhaust constructed in the form of a silencer. The casing (1) of the exhaust is subdivided by partitions (5, 6) into a number of chambers lying axially one behind the other. The excess pressure chamber (4) and the chamber (3) disposed therebehind in the direction of flow and directly connected to the exhaust gas outlet (9) are interconnected via a valve arrangement (16–18) which so operates after the fashion of a non-return valve that the valves are throttled in dependence on the inclined position of the exhaust. During climbing throttling is particularly heavy, so that a heavier excess pressure is formed in the chamber and therefore higher delivery pressure acts on the fuel in the tank. In this way the engine is supplied with enough fuel even during climbing.

8 Claims, 5 Drawing Figures

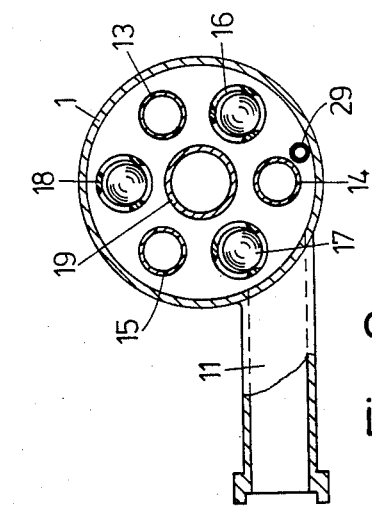
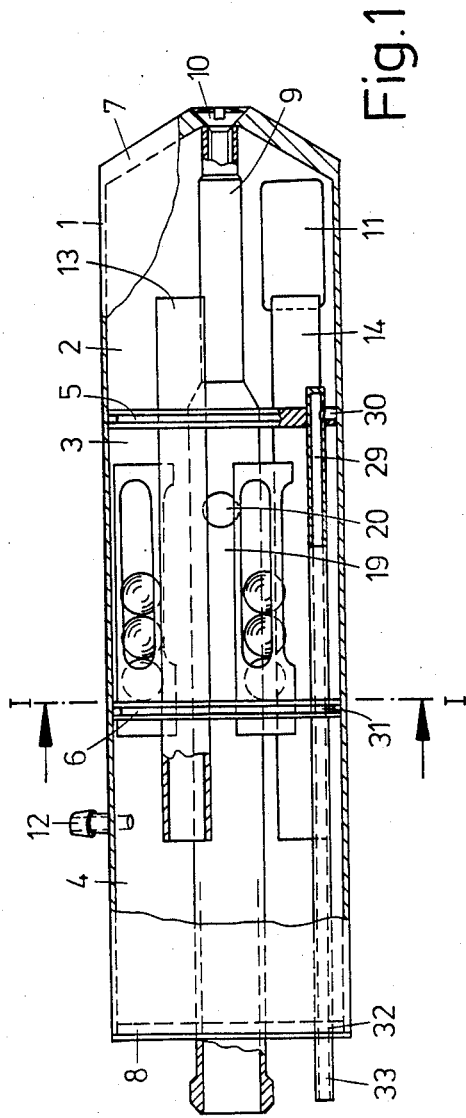
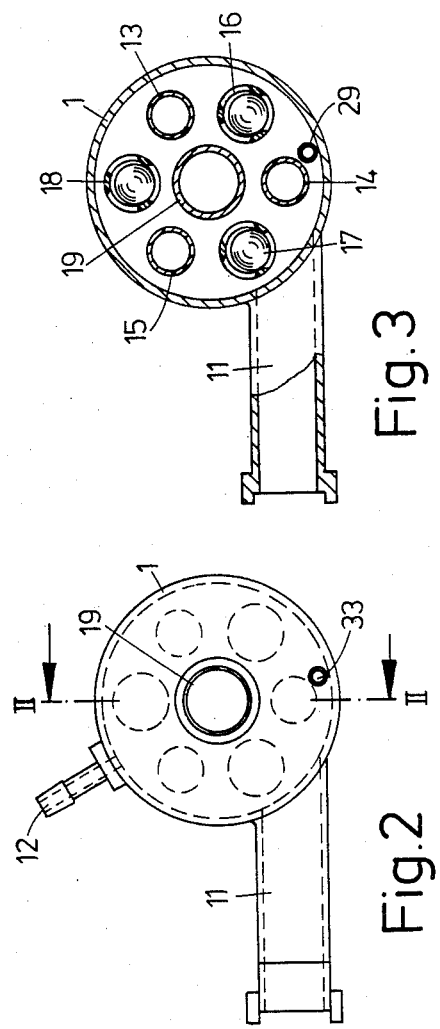

FUEL SUPPLY DEVICE FOR ENGINES, MORE PARTICULARLY OF MODEL AIRCRAFT

BACKGROUND OF THE INVENTION

1. Field of the Invention

The invention relates to a fuel supply device for engines, more particularly for model aircraft, comprising: a fuel tank which is sealed off against atmosphere and is connected via a fuel outlet line to the engine and via a gas line to an excess pressure chamber in an exhaust constructed in the form of a silencer, the express pressure chamber being connected on the inlet side to the combustion gas outlet to the engine and having an exhaust gas outlet extending to atmosphere.

2. Discussion of Prior Art

Although in normal flying conditions (horizontal flight and gentle climbing) the pressure in the excess pressure chamber is adequate to force the fuel required by the engine out of the tank into the fuel outlet line, in a steep climb such pressure is no longer enough. In dependence on the position of the tank and the inlet of the fuel outlet line, similar conditions may occur during heavy acceleration of the model aircraft or some other engine-driven vehicle. If the pressure produced in the tank is no longer adequate for the fuel supply, the engine cuts out. In addition to this, investigations have shown that the engine runs irregularly if it can obtain return air from the exhaust.

SUMMARY OF THE INVENTION

It is an object of the invention so to improve the known fuel supply device that the engine is adequately supplied with fuel even when climbing steeply and/or heavily accelerated.

In the fuel supply device according to the invention the various degree of excess pressure required for satisfactory fuel supply in any flight position is ensured without expensive control systems solely by the variously heavy throttling of the valve arrangement, in dependence on the inclined position.

The same effect is also achieved in the positive and negative acceleration of an engine-driven vehicle, since the forces of inertia control the valve.

In one embodiment of the invention the valve arrangement comprises at least one valve seat and at least one valve member mounted to move in a guide, the guide being so disposed and constructed that the force of gravity acting on the valve member in the direction of the valve seat can become operative with a component depending on the inclined position of the exhaust. With this embodiment of the invention the force of gravity is used in the simplest possible, purely mechanical way for the degree to which the valve is throttled.

Preferably the valve arrangement comprises a number of identical valves. The force by which the valve is to be throttled can be determined by the weight of the valve members. This can be done, for example, by at least one further movable valve member being retained alongside the valve member in each guide. A very simple construction is for the guide to consist of a longitudinally slotted tube.

More particularly if a number of valves are used, conveniently the guide of the valve members is disposed in a further chamber in the exhaust, from which chamber the exhaust gas outlet extending to atmosphere emerges.

In a fuel supply device which has already proved valuable in practice, the exhaust has three chambers which are dipsosed axially one behind the other, of which the two outer chambers are interconnected via at least one tube extending closed through the central chamber, the second chamber in the direction of flow of the exhaust gases being connected to the central chamber via the valve arrangement.

Since as a rule the fuel contains oil which might impede the mobility of the valve members with a cold exhaust and therefore adversely affect the operation of the valve arrangement, according to another feature of the invention the chambers are also interconnected via a line extending to atmosphere, the line having at the lowest place of the chambers inlets whose free cross-section is substantially (a fraction) smaller than the free cross-section of the other connections.

DESCRIPTION OF AN EMBODIMENT OF THE INVENTION

Brief Description of the Drawing

FIG. 1 is a side elevation of an exhaust, with the casing partially removed,

FIG. 2 is an end elevation of the exhaust illustrated in FIG. 1, viewed from the exhaust gas outlet side, FIG. 3 is a cross-section through the exhaust illustrated in FIG. 1, taken along the line I—I in FIG. 1.

DETAILED DESCRIPTION OF THE EMBODIMENT OF THE INVENTION

Figure 4:
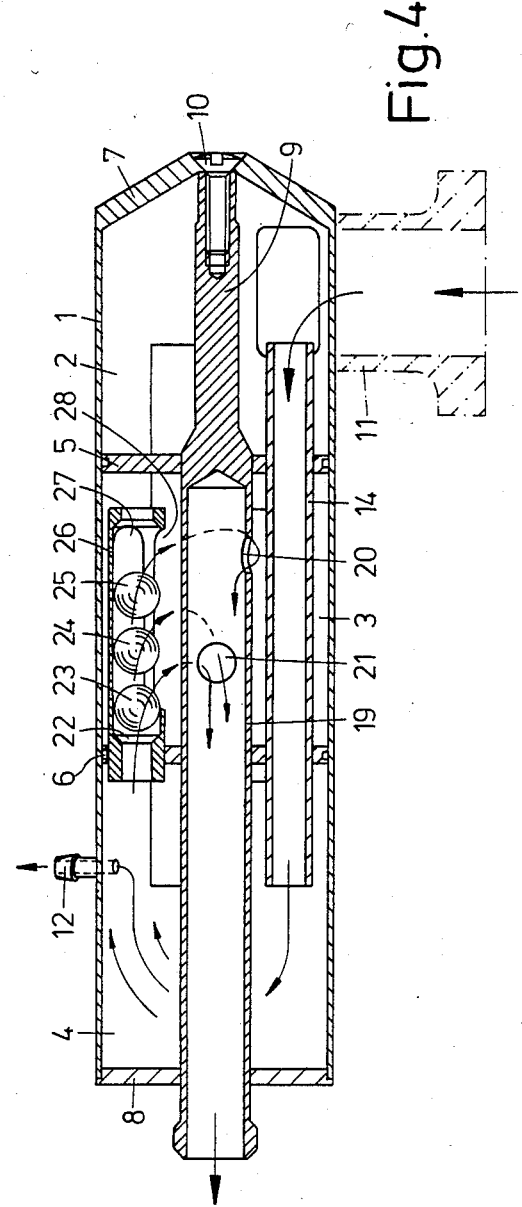
FIG. 4 is an axial section through the exhaust illustrated in FIG. 1, taken along the line II—II in FIG. 2.
Figure 5:
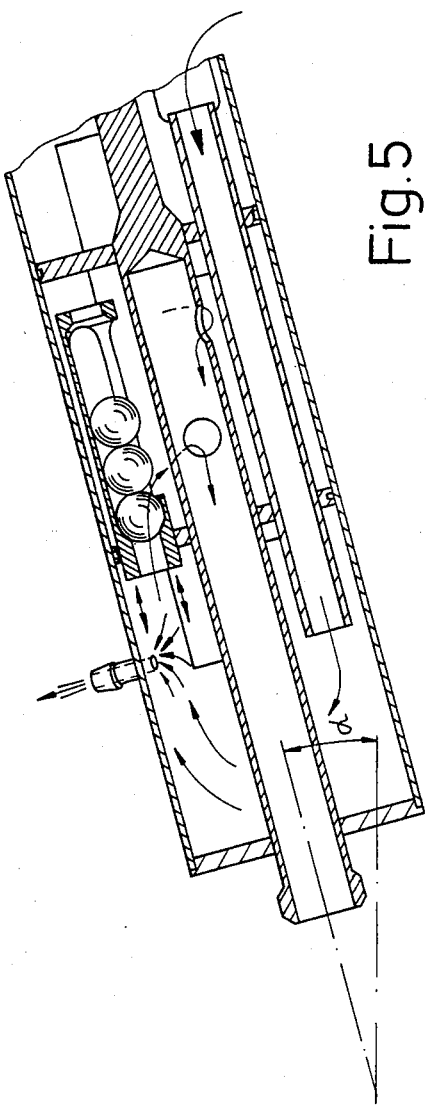
FIG. 5 is an axial section of a portion of the exhaust illustrated in FIG. 1 during climbing, taken along the line II—II in FIG. 2.

An exhaust comprises a circular cylindrical casing 1 and an insert subdividing the casing 1 into three chambers 2, 3, 4 having walls 5, 6. The casing is closed on one side by a moulded-on cover 7 and on the other side by a cover 8 of the insert. The insert is retained in the casing 1 by means of a screw bolt 10 on the casing cover 7 and attached to a central pin 9 of the insert.

The chamber 2 is connected to an engine (not shown) via a combustion gas inlet 11 taking the form of a spigot moulded on to the casing 1. Extending from the chamber 4 is a combustion gas outlet 12 in the form of a hose enclosure onto which a line (not shown) extending to the tank can be fitted, so that the pressure in the chamber 4 is transmitted to the tank.

The chambers 2 and 4 are interconnected via three tubes 13, 14, 15 which are disposed distributed symmetrically around the cylinder axis and retained in the partitions 5, 6. The combustion gases which pass via the spigot 11 into the chamber 2 can therefore flow on via the tubes 13 to 15 into the chamber 4. The chamber 4 is connected via three identical valves 16, 17, 18 to the central chamber 3. Extending from the central chamber 3 is a central tube 15 formed with peripherally distributed inlet apertures 20, 21 which extends closed through the last chamber 4 to atmosphere and forms the exhaust outlet.

The three identical valves 16 to 18 are constructed after the fashion of non- return valves. They each comprise a valve seat 22 and a valve member 23 which takes the form of a ball and is loosely mounted together with further balls 24, 25 in a guide 26 formed by a tube having a number of longitudinal slots 28.

Disposed at the bottom of the casing 7 is a line 29 which is retained in the partitions 5, 6 and the cover 8 and which is formed in the zone of the partitions 5, 6 and the cover 8 with inlets 30, 31, 32 open in the direction of the individual chambers 2, 3, 4 and which extends via its outlet 33 to atmosphere.

The fuel supply according to the invention operates as follows:

The combustion gases produced by the engine pass via the combustion gas outlet 11 to the chamber 2, from which they pass via lines 13 to 15 into the chamber 4. A certain excess pressure builds up in the chamber 4 and is transmitted via the combustion gas outlet 12 to the tank, so that the fuel is supplied pressurized from the tank to the engine. The level of the pressure depends on the exhaust position, determined by the position of the aircraft. As long as the aircraft is in horizontal flight, the pressure can flow without substantial resistance via valves 16 to 18 into the central chamber 3, and from the central chamber 3 via the line 19 to atmosphere. It may be necessary to prestress the valve members 23 by means of a spring, so that adequate excess pressure builds up in the chamber 4 even during horizontal flight. However, such excess pressure can also be obtained by natural constant throttling of the individual outlets.

As soon as the aircraft starts to climb, the valve member 23 is applied to the associated valve seat 22 and closes the valve with a force depending on the inclined position of the exhaust. The additional movable members boost such force. An excess pressure corresponding to such force is built up in the chamber 3, so that a higher excess pressure is produced in the tank than during horizontal flight. This higher excess pressure ensures that the engine is adequately supplied with fuel even during climbing.

Due to the fact that the valve members 23 can move in the direction of movement of the model aircraft, a force of inertia operates on the valve members also during positive and negative acceleration. The valve arrangement is therefore so disposed that with positive acceleration the valve member is throttled to a varying extent, and therefore even in this phase critical for the fuel supply an adequate excess pressure is available to supply the engine with enough fuel.

It has been found that the valves acting as non-return valves prevent the engine from obtaining return air, so that the engine runs more quietly.

Any oil in the exhaust gases which is deposited on the casing walls and collects in the lower zone of the casing is removed via the line 29 by the pressure in the individual chambers.

A large quantity of oil is therefore prevented from collecting in the casing and when cold having an adverse effect on the mobility of the valve members 23 and therefore on their function of independent pressure regulation.

What is claimed is:

1. A fuel supply device for engines, more particularly for model aircraft, comprising: a fuel tank which is sealed off against atmosphere and is connected via a fuel outlet line to the engine and via a gas line to an excess pressure chamber in an exhaust constructed in the form of a silencer, the excess pressure chamber being connected on the inlet side to a combustion gas outlet of the engine and having an exhaust gas outlet extending to the atmosphere, characterized in that disposed in the exhaust gas outlet of the excess pressure chamber (4) is at least one valve arrangement (16, 17, 18) which throttles the exhaust gas outlet in dependence on the inclined position of the exhaust and the forces of inertia.

2. A fuel supply device according to claim 1, wherein the valve arrangement comprises at least one valve seat (22) and at least one valve member (23) mounted to move in a guide (26), the guide (26) being so disposed and constructed that the force of gravity acting on the valve member (23) in the direction of the valve seat (22) can become operative with a component depending on the inclined position of the exhaust.

3. A fuel supply device according to claims 1 or 2, wherein the valve arrangement comprises a number of identical valves (16, 17, 18).

4. A fuel supply device according to claim 2, wherein at least one further movable member (24, 25) is retained alongside the valve member (23) in the guide (26) thereof.

5. A fuel supply device according to claim 2, wherein the guide (26) is formed by a longitudinally slotted tube.

6. A fuel supply device according to claim 2, wherein the guide (26) of the valve members (23) is disposed in a further chamber (3) in the exhaust, from which chamber the exhaust gas outlet (19) extending to atmosphere emerges.

7. A fuel supply device according to claim 1, wherein the exhaust has three chambers (2, 3, 4) which are disposed axially one behind the other, of which the two outer chambers (2, 4) are interconnected via at least one tube (13, 14, 15) extending closed through the central chamber (3), the second chamber (4) in the direction of flow of the exhaust gases being connected to the central chamber (3) via the valve arrangement (16, 17, 18).

8. A fuel supply device according to claim 7, wherein the chambers (2, 3, 4) are also interconnected via a line (29) extending to atmosphere, the line (29) having at the lowest place of the chambers (2, 3, 4) inlets (30, 31, 32) whose free cross-section is substantially (a fraction) smaller than the free cross-section of the other connections (13–18).

* * * * *